United States Patent
Nakagawa (10) Patent No.: US 12,091,036 B2
(45) Date of Patent: Sep. 17, 2024

(54) DRIVER ASSIST SYSTEM

(71) Applicant: TOYOTA JIDOSHA KABUSHIKI KAISHA, Toyota (JP)

(72) Inventor: Yuki Nakagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 32 days.

(21) Appl. No.: 18/125,320

(22) Filed: Mar. 23, 2023

(65) Prior Publication Data

US 2023/0303106 A1 Sep. 28, 2023

(30) Foreign Application Priority Data

Mar. 25, 2022 (JP) .................. 2022-050677

(51) Int. Cl.
*B60W 50/14* (2020.01)

(52) U.S. Cl.
CPC ....... *B60W 50/14* (2013.01); *B60W 2050/143* (2013.01); *B60W 2050/146* (2013.01); *B60W 2554/40* (2020.02); *B60W 2554/80* (2020.02)

(58) Field of Classification Search
CPC ............. B60R 11/04; B60R 2011/0042; G01S 13/931; G01S 2013/9315; G01S 2013/93272; B60W 2050/143; B60W 2420/408; B60W 2554/4041; B60W 2554/4042; B60W 2554/80; B60W 2554/801; B60W 2554/802; B60W 50/14; B60W 2050/0083; B60W 2050/146; B60W 2520/10; B60W 2552/00; B60W 2554/40; B60W 2554/4044; B60W 2554/4045; B60W 2554/803; B60W 2554/804; B60W 2556/10; B60W 30/095; B60W 30/18163; B60W 40/04; B60W 60/001; B60Q 9/008; G08G 1/167; G08G 1/052; G08G 1/16; G08G 1/163; G08G 1/166; G06V 20/58; G06V 10/764; G06V 10/75; G06V 20/588; B60T 2201/022

See application file for complete search history.

(56) References Cited

U.S. PATENT DOCUMENTS

| | | | |
|---|---|---|---|
| 2006/0217848 A1* | 9/2006 | Oesterling | G08G 1/207 701/1 |
| 2019/0241182 A1* | 8/2019 | Sato | B60R 21/00 |
| 2023/0316926 A1* | 10/2023 | Itoh | B60W 40/04 701/301 |
| 2024/0132095 A1* | 4/2024 | Parkin | G01S 13/931 |

FOREIGN PATENT DOCUMENTS

JP 2010-187136 A 8/2010

* cited by examiner

*Primary Examiner* — Dionne Pendleton
(74) *Attorney, Agent, or Firm* — Dinsmore & Shohl LLP (57) ABSTRACT

A driver assist system configured to accurately recognize a target vehicle in a communication area set in front of a vehicle to assist a driver to operate the vehicle. The driver assist system notifies a driver of existence of the target vehicle in the communication area. A controller comprises: a timer that measures an elapsed time from a point at which the target vehicle moved out of the communication area; and a recognizer that recognizes other vehicle as a target vehicle until the elapsed time exceeds a threshold period of time, and that cancels a recognition of other vehicle as the target vehicle when the elapsed time exceeds the threshold period of time.

8 Claims, 8 Drawing Sheets

DRIVER ASSIST SYSTEM

CROSS REFERENCE TO RELATED APPLICATIONS

The present disclosure claims the benefit of Japanese Patent Application No. 2022-050677 filed on Mar. 25, 2022 with the Japanese Patent Office, the disclosure of which are incorporated herein by reference in its entirety.

BACKGROUND

Field of the Disclosure

Embodiments of the present disclosure relate to the art of a driver assist system configured to assist a driver to operate a vehicle easily by providing peripheral information to alert the driver.

Discussion of the Related Art

In order to avoid the risk of accident such as a rear-end collision during manual operation of a vehicle, it is necessary for a driver to obtain information about existence and behaviors of other vehicles. For example, JP-A-2010-187136 describes a system for providing information about positions and speeds of other vehicles to a driver. Specifically, the system described in JP-A-2010-187136 exchanges information with other vehicles through a radio communication, and collected information about positions and speeds of other vehicles is indicated in a display or provided phonically to the driver. According to the teachings of JP-A-2010-187136, a current position of a vehicle to which the system described in JP-A-2010-187136 is applied is obtained through a GPS (i.e., a Global Positioning System), and a detection area is set based on the current position of the vehicle. Specifically, the detection area is set to a rectangular area by adding or subtracting predetermined values to a coordinate of the current position of the vehicle thereby setting coordinates of four corners of the rectangular area. That is, the system described in JP-A-2010-187136 collects information about positions and speeds of other vehicles within such detection area to assist the driver.

Thus, according to the teachings of JP-A-2010-187136, only the information about other vehicles necessary to assist the driver is collected only within the detection area. According to the teachings of JP-A-2010-187136, therefore, the information will not be collected excessively so that the burden of the system may be lightened to avoid a control delay. However, although the information about other vehicles necessary to assist the driver is collected only within the limited area, a relative position of the vehicle with respect to other vehicles varies widely depending on road configurations. That is, a target vehicle to collect the information thereof continuously to assist the driver may move out of the detection area.

For example, provided that a road on which the vehicle travels curves ahead of the vehicle, the target vehicle running ahead of the vehicle will move out of the detection area at a curved section. In this situation, however, the relative position of the vehicle to the target vehicle is still unchanged. Therefore, in spite of the fact that the information about the target vehicle is still necessary to be collected to assist the driver, the information about the target vehicle which has already moved out of the detection area is no longer available. Especially, when the vehicle travels through a winding road, the target vehicle running ahead of the vehicle will enter and leave the detection area repeatedly and frequently. Consequently, an instruction to assist the driver will be indicated or announced repeatedly to bother the driver.

SUMMARY

Aspects of the present disclosure have been conceived noting the foregoing technical problems, and it is therefore an object of the present disclosure to provide a driver assist system configured to accurately recognize a target vehicle entering a communication area set in front of a vehicle having the driver assist system, so as to assist a driver to operate the vehicle.

According to the exemplary embodiment of the present disclosure, there is provided a driver assist system that sets a communication area in front of a vehicle to which the driver assist system is applied, that recognizes other vehicle existing within the communication area as a target vehicle, and that notifies a driver of the vehicle of at least an existence of the target vehicle. In order to achieve the above-explained objective, according to the exemplary embodiment of the present disclosure, the driver assist system is provided with a controller that controls assistance information to assist the driver to operate the vehicle. Specifically, the controller comprises: a timer that measures an elapsed time from a point at which the target vehicle moved out of the communication area; and a recognizer that recognizes said other vehicle as the target vehicle until the elapsed time measured by the timer exceeds a threshold period of time, and that cancels a recognition of said other vehicle as the target vehicle when the elapsed time measured by the timer exceeds the threshold period of time.

In a non-limiting embodiment, the driver assist system may further comprise: a determiner that determines a degree of similarity between vehicular information about said other vehicle located within the communication area and vehicular information about the vehicle by comparing the information about said other vehicle with the information about the vehicle; and a control selector that selects a control from different controls depending on the degree of similarity determined by the determiner.

In a non-limiting embodiment, the control selector may comprise a time adjuster that adjust the threshold period of time based on the degree of similarity determined by the determiner. The time adjuster may be configured to extend the threshold period of time when the degree of similarity is larger than a predetermined degree, and shorten the threshold period of time when the degree of similarity is smaller than the predetermined degree.

In a non-limiting embodiment, the vehicular information about the vehicle may include an azimuth angle and a speed of the vehicle, and the vehicular information about said other vehicle may include an azimuth angle and a speed of said other vehicle. In addition, the degree of similarity determined by the determiner increases with a reduction in a difference between the azimuth angles or the speeds of the vehicle and said other vehicle.

In a non-limiting embodiment, the determiner may be further configured to calculate the difference between the speeds of the vehicle and said other vehicle by comparing the speed of the vehicle when passing through a predetermined site to the speed of said other vehicle when passing through the predetermined site.

In a non-limiting embodiment, the control selector may include an excluder that excludes other vehicle in the communication area whose degree of similarity determined by the determiner is equal to or smaller than a threshold limit value from the target vehicle.

According to the exemplary embodiment of the present disclosure, other vehicle running within the communication area is recognized as the target vehicle, and the driver is notified of an existence of the target vehicle based on the information collected from the target vehicle. According to the exemplary embodiment of the present disclosure, therefore, the driver is allowed to keep a fair distance to the target vehicle running ahead thereby avoiding a rear-end collision. For example, in a case that the target vehicle traveling through a curve deviates from the communication area, the recognition of the target vehicle is maintained until the elapsed time that the target vehicle travels out of the communication area exceeds the threshold period of time so as to collect information from the target vehicle. In this case, when the vehicle following the target vehicle enters the curve before the above-mentioned elapsed time exceeds the threshold period of time, the target vehicle is covered with the communication area and the recognition of the target vehicle is maintained. Thus, even if the target vehicle temporarily deviates from the communication area, the information is collected continuously from the target vehicle and conveyed to the driver. That is, the driver assist control is continued without interruption. By contrast, if the above-mentioned elapsed time exceeds the threshold period of time, the recognition of the target vehicle is cancelled and the information about the target vehicle is no longer provided to the driver. That is, the driver assist control is not continued unnecessarily and erroneously.

Specifically, if the degree of similarity between the information about traveling directions or speeds of the target vehicle and the vehicle is increased, the threshold period of time is extended. In this case, even if the target vehicle travels out of the communication area for a long time, a relative position of the vehicle with respect to the target vehicle is maintained. Therefore, the driver assist control is maintained to notify the existence of the target vehicle to the driver. By contrast, if the degree of similarity is small, provision of the information about the target vehicle to the driver is not especially necessary. In this case, therefore, the threshold period of time is shortened, and the driver assist control is not continued unnecessarily.

In addition, as to an oncoming vehicle in the communication area, a degree of similarity of a running condition thereof with a running condition of the vehicle is smaller than the threshold limit value. Therefore, the oncoming vehicle is excluded from the target vehicle, and the driver will not be notified of an existence of the oncoming vehicle erroneously and unnecessarily.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION

Embodiments of the present disclosure will now be explained with reference to the accompanying drawings. Note that the embodiments shown below are merely examples of the present disclosure, and do not limit the present disclosure.

According to the embodiment of the present disclosure, there is provided a driver assist system that provides information to a driver about other vehicles running ahead of a vehicle to which the driver assist system is applied (hereinafter, simply referred to as the vehicle). According to the exemplary embodiment of the present disclosure, therefore, the driver is allowed to keep a fair distance to the vehicle running ahead thereby avoiding a rear-end collision. Specifically, the driver assist system is configured to detect other vehicles even if map data is not available in the vehicle, and to provide information about the detected vehicle to the driver so as to assist the driver to operate the vehicle.

Figure 1:
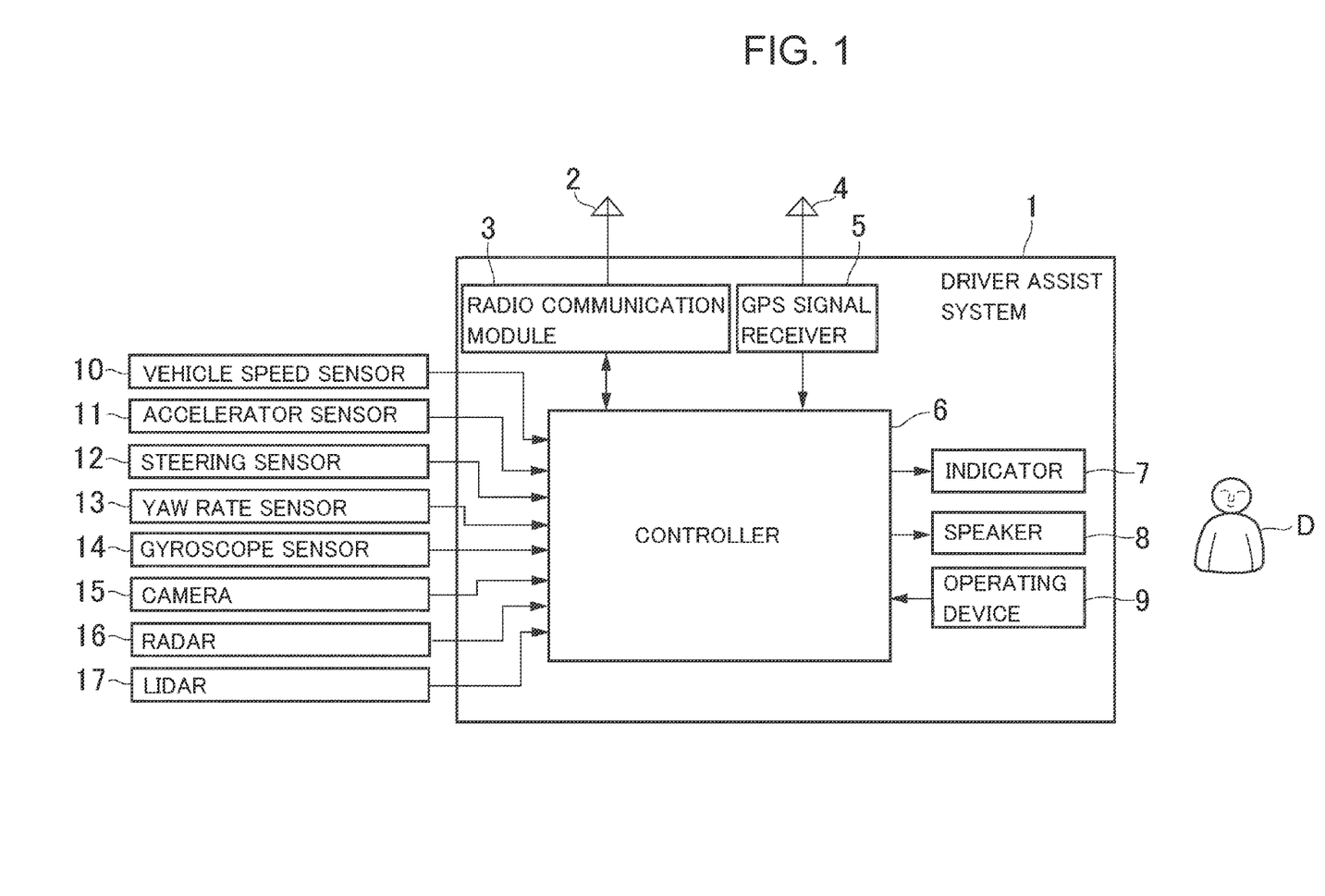
FIG. 1 is a block diagram schematically showing a structure of a hardware of the driver assist system according to the exemplary embodiment of the present disclosure.

Referring now to FIG. 1, there is shown one example of a structure of a hardware of the driver assist system 1 that collects and process the information about other vehicles. As shown in FIG. 1, the driver assist system 1 comprises a radio antenna 2, a radio communication module 3, a GPS (i.e., global positioning system) antenna 4 that receives a signal from a GPS satellite, a GPS signal receiver 5, a controller 6, an indicator 7, a speaker 8, and an operating device 9.

Information is exchanged between the vehicle and other vehicle via the radio antenna 2, and also between the vehicle and an external communication device installed on a road via the radio antenna 2. For example, the external communication device includes an optical beacon, a radio beacon, a broadcasting device of an FM radio station, and a DSRC (i.e., Dedicated Short Range Communication) module.

The radio communication module 3 transmits signals to other vehicles and the external communication device through the radio antenna 2, and receives signals through the radio antenna 2. The signals received by the radio communication module 3 is demodulated by the radio communication module 3 and further transmitted to the controller 6.

The GPS signal receiver 5 receives GPS signals from GPS satellites through the GPS antenna 4, and transmit the incident signals to the controller 6 so that a current position of the vehicle (on a coordinate) is computed by the controller 6 based on the signals transmitted from the GPS satellites. Otherwise, a current position of the vehicle may also be computed based on an inertial navigation method by calculating a speed of the vehicle and a distance to a predetermined destination while determining a traveling direction by a gyroscope sensor.

The controller 6 collects information about positions (on a coordinate) and speeds of other vehicles thorough an inter-vehicle communication and a road-to-vehicle communication during propulsion. In addition, the controller 6 provides the information about positions and speeds of other vehicles to the driver D of the vehicle visually (i.e., imagery) by the indicator 7 and phonically by the speaker 8. Therefore, the driver D is allowed to confirm the existence of other vehicles to be assisted to operate the vehicle safely in coordination with other vehicles.

Information about the vehicle may be inputted through the operating device 9. For example, a driver assist control may be executed and terminated by operating the operating device 9. In addition, details of the driver assist control and a communication area may be selected by operating the operating device 9. The information inputted to the operating device 9 is transmitted to the controller 6.

In order to collect information about the vehicle, the driver assist system 1 is provided with a vehicle speed sensor 10, an acceleration sensor 11, a steering sensor 12, a yaw rate sensor 13, a gyroscope sensor 14. In addition, in order to collect peripheral information of the vehicle, the driver assist system 1 is further provided with a camera 15, a radar 16, and a lidar 17. As illustrated in FIG. 1, those sensors and devices are connected to the controller 6.

Figure 2:
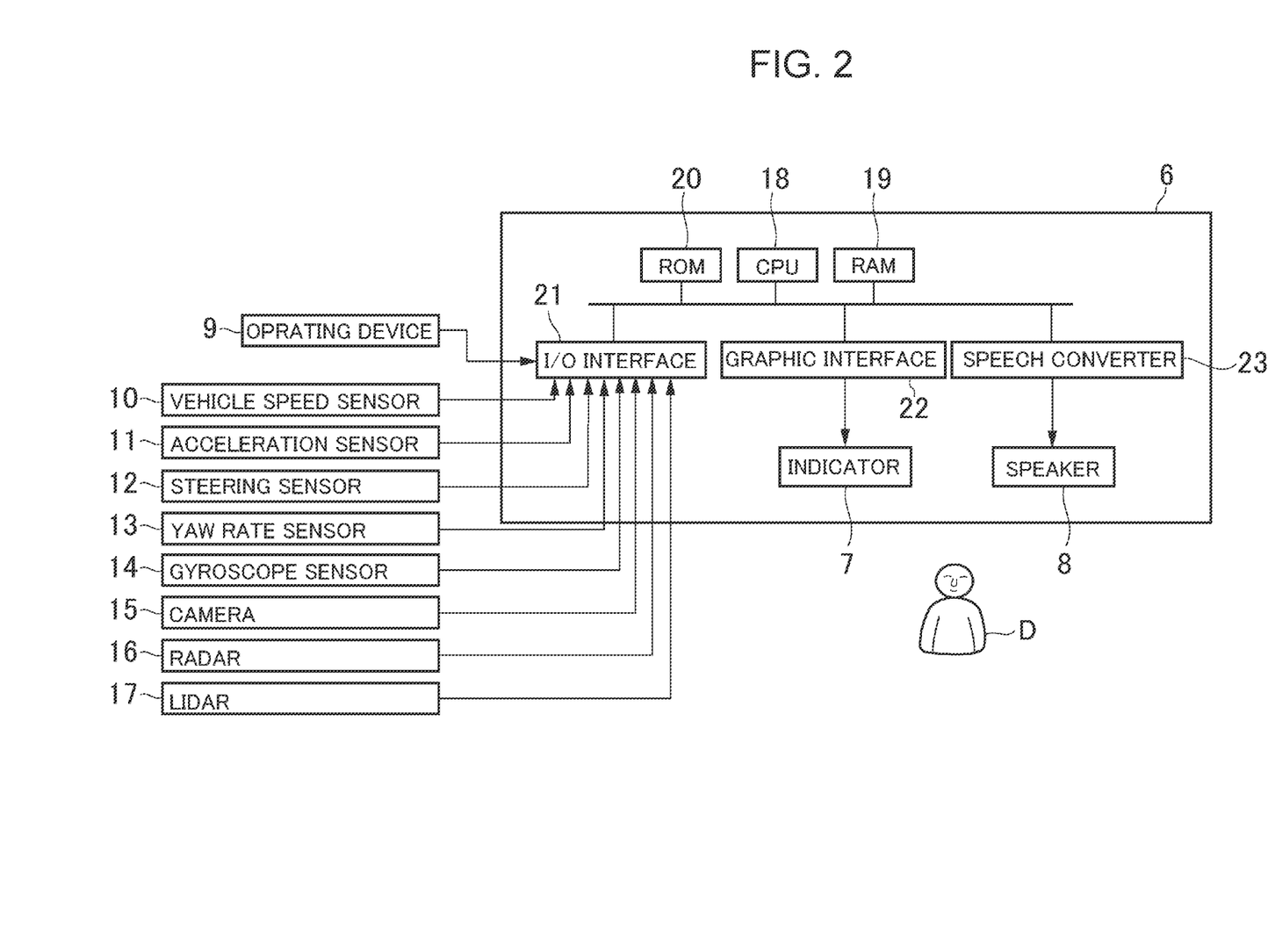
FIG. 2 is a block diagram schematically showing a structure of a controller of the driver assist system according to the exemplary embodiment of the present disclosure.

The controller 6 comprises a microcomputer as its main constituent. Specifically, as schematically shown in FIG. 2, the controller 6 comprises a CPU 18, a RAM 19, a ROM 20, an input-output interface 21, a graphic interface 22, and a speech converter 23.

The CPU 18 performs calculation with reference to programs stored in the ROM 20, and transmits a calculation result in the form of command signal to execute an intended control. Data about calculation results and interim calculation results by the CPU 18, that is, the data about the vehicle and the data about other vehicles are stored in the RAM 19.

The GPS signal, the information inputted to the operating device 9, the data collected by the above-mentioned sensors and devices are transmitted to the input-output interface 21, and further transmitted from the input-output interface 21 to the CPU 18.

In order to indicate an image processed by the CPU 1 in the indicator 7, the graphic interface 22 converts a graphic data into a waveform signal.

A voice signal created by the controller 6 is processed by the speech converter 23, and a resultant voice message is emitted from the speaker 8.

Figure 3:
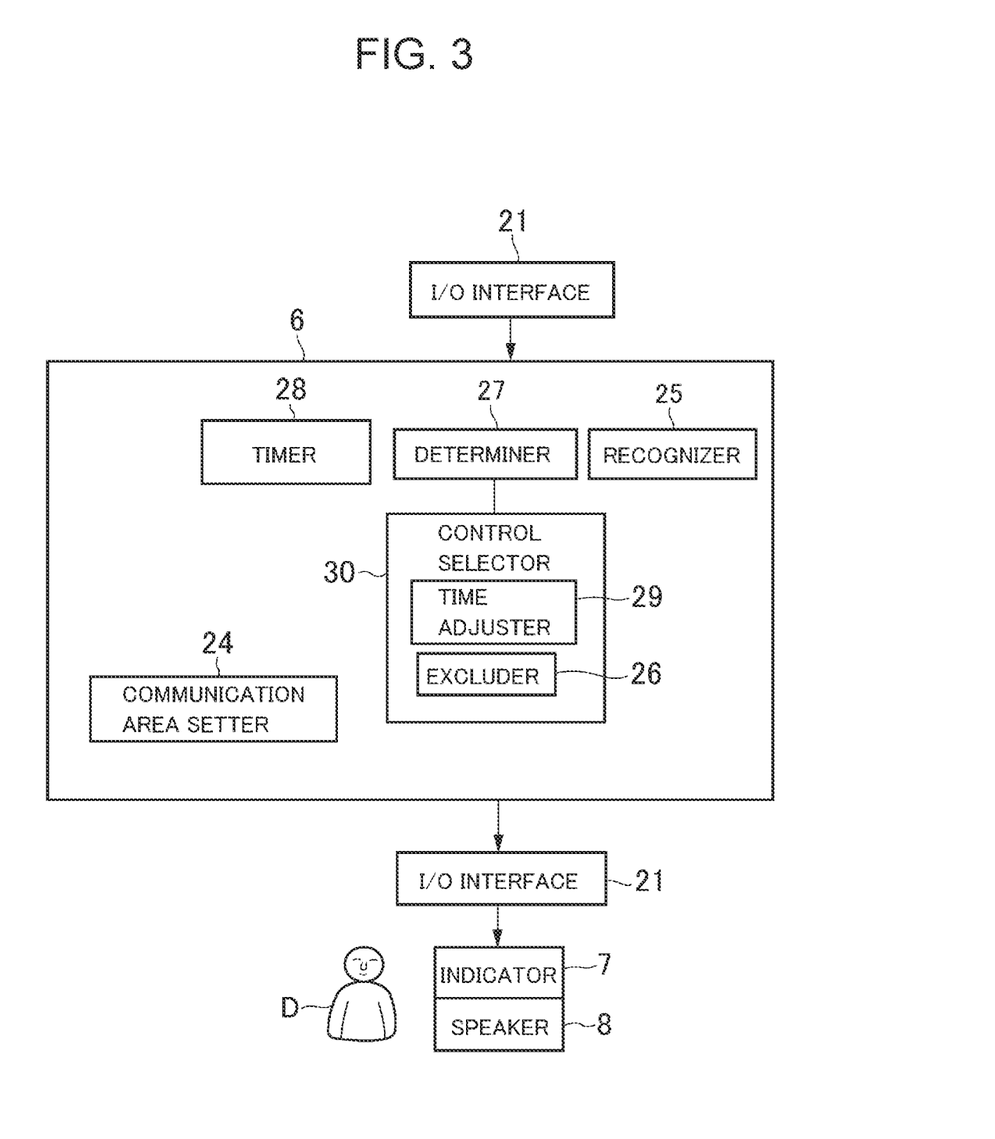
FIG. 3 is a block diagram schematically showing functions of the controller.

The controller 6 is configured to execute an after-mentioned routine, and to this end, the controller 6 comprises structure shown in FIG. 3.

The driver assist system 1 is configured to collect positional information about other vehicle running ahead of the vehicle through the inter-vehicle communication, and to assist the driver to operate the vehicle utilizing the collected information. In order to detect an existence of other vehicle, the controller 6 comprises a communication area setter 24 that sets a communication area based on the positional information of the vehicle. For example, the communication area is set virtually ahead of the vehicle by adding or subtracting predetermined values to a coordinate of the current position of the vehicle thereby setting coordinates of four corners of a rectangular area, and connecting four corners of the rectangular area to define the communication area. However, a shape of the communication area should not be limited to the rectangular shape, and may be altered flexibly.

For example, the communication area may also be set to a curved area in accordance with a steering angle or a yaw rate of the vehicle in a case of traveling through a curved road. That is, the communication area may be set not only as a fixed area but also as a flexible area. In order to assist the driver not to rear-end the vehicle in front or not to approach too close to the vehicle in front, dimensions of the communication area are set to have sufficient length and width to enclose the vehicle in front. To this end, for example, the length of the communication area may be set in accordance with a speed of the vehicle, and the width of the communication area may be set to a width of a road. In addition, the length of the communication area may be increased with an increase in a speed of the vehicle. The vehicle in front may be specified based on the data collected by the camera 15, the radar 16, and the lidar 17.

The controller 6 further comprises a recognizer 25 that recognizes other vehicle entering the communication area as a target vehicle, and the driver D of the vehicle is notified of an existence of the target vehicle. Specifically, other vehicle that has entered the communication area at least one time is recognized as the target vehicle. Given that other vehicle enters the communication area has a function to exchange information through the inter-vehicle communication and the road-to-vehicle communication, information about other vehicle may be transmitted to the vehicle through the inter-vehicle communication and the road-to-vehicle communication. Otherwise, other vehicle enters the communication area may also be detected by the camera 15 and the radar 16. More specifically, in a case that other vehicle currently travels within the communication area, said other vehicle is recognized as the target vehicle if a degree of similarity between the information about a condition of said other vehicle and the information about a condition of the vehicle is equal to or greater than a threshold limit value. In addition, in a case that other vehicle has travelled within the communication area but currently travels out of the communication area, said other vehicle is also recognized as the target vehicle until an elapsed time that said other vehicle travels out of the communication area exceeds a threshold period of time.

Specifically, the information about a condition of the vehicle or other vehicle is a physical quantity representing a condition of the vehicle or other vehicle such as a speed and a traveling direction (i.e., an orientation or azimuth) of the vehicle or other vehicle. That is, a degree of similarity of the information increases with a reduction in a difference between the physical quantities representing conditions of the vehicle and other vehicle, and decreases with an increase in the difference between the physical quantities representing conditions of the vehicle and other vehicle. On the other hand, the above-mentioned threshold limit value is an upper limit value of the difference between the physical quantities representing the conditions of the vehicle and other vehicle. In order to exclude oncoming vehicles from the target vehicle, the threshold limit value is set to a large value possible to determine a difference between traveling directions or azimuth angles of the vehicle and the other vehicles. Specifically, such determination is made by an excluder 26 to exclude unqualified vehicle from the target vehicle.

The controller 6 further comprises a determiner 27 that determines a degree of similarity between the information about a condition of other vehicle and the information about a condition of the vehicle. Specifically, the determiner 27 determines the degree of similarity by comparing current information about other vehicle with current information about the vehicle. Otherwise, the determiner 27 determines the degree of similarity by comparing information about other vehicle collected a predetermined period of time ago with information of the vehicle collected a predetermined period of time ago. That is, in order to make such determination, the determiner 27 compares a physical quantity representing a condition of other vehicle with a physical quantity representing a condition of the vehicle. To this end, the physical quantity may be divided into a plurality of parts. In this case, the determiner 27 compares a specific part of the physical quantity representing a condition of other vehicle with a counterpart of the physical quantity representing a condition of the vehicle. In addition, the degree of similarity may also be determined by comparing a plurality of physical quantities representing conditions of other vehicle with a plurality of physical quantities representing conditions of the vehicle.

As described, the communication area is set in front of the vehicle based on the positional information of the vehicle. However, a traveling direction and a position of the vehicle in front are changed depending on road configurations and existence of obstacles ahead, and in addition, the vehicle in front would move out of the communication area. In order to measure an elapsed time from a point at which the target vehicle moved out of the communication area, the controller 6 further comprises a timer 28. Therefore, the recognition of the target vehicle will not be cancelled immediately and maintained for a predetermined period of time even if the target vehicle moves out of the communication area.

The controller 6 further comprises a time adjuster 29 that adjust the threshold period of time based on the determination made by the determiner 27. As described, the recognition of the target vehicle is maintained for the threshold period of time even if other vehicle which has been recognized as the target vehicle moves out of the communication area. In this situation, if the degree of similarity between the information about the target vehicle and the information about the vehicle up to this time is large, it can be assumed that the target vehicle deviates from the communication area for a temporary reason, and that the relative position of the vehicle with respect to the target vehicle will be maintained. By contrast, if the degree of similarity between the information about the target vehicle and the information about the vehicle is small, it can be assumed that the target vehicle runs in a different manner from the vehicle to deviate from the communication area. In this case, therefore, the relative position of the vehicle with respect to the target vehicle is expected to be changed, and the target vehicle is expected to disappear from a space in front of the vehicle. Thus, a change in the relative position of the vehicle with respect to the target vehicle may be estimated based on the degree of similarity between the information about the target vehicle and the information about the vehicle. According to the exemplary embodiment of the present disclosure, therefore, the threshold period of time to maintain the recognition of the target vehicle is changed depending on the degree of similarity between the information about the target vehicle and the information about the vehicle. For example, if the degree of similarity of the information is larger than a predetermined degree, the threshold period of time is extended. By contrast, if the degree of similarity is smaller than a predetermined degree, the threshold period of time is shortened.

In order to exclude unqualified vehicle from the target vehicle and to adjust the threshold period of time, the excluder 26 and the time adjuster 29 serve as a control selector 30.

In order not to bother the driver, the driver assist system 1 according to the exemplary embodiment of the present disclosure is configured to avoid an undesirable interruption and repetition of the driver assist control in a situation where it is desirable to continue the driver assist control.

Figure 4:
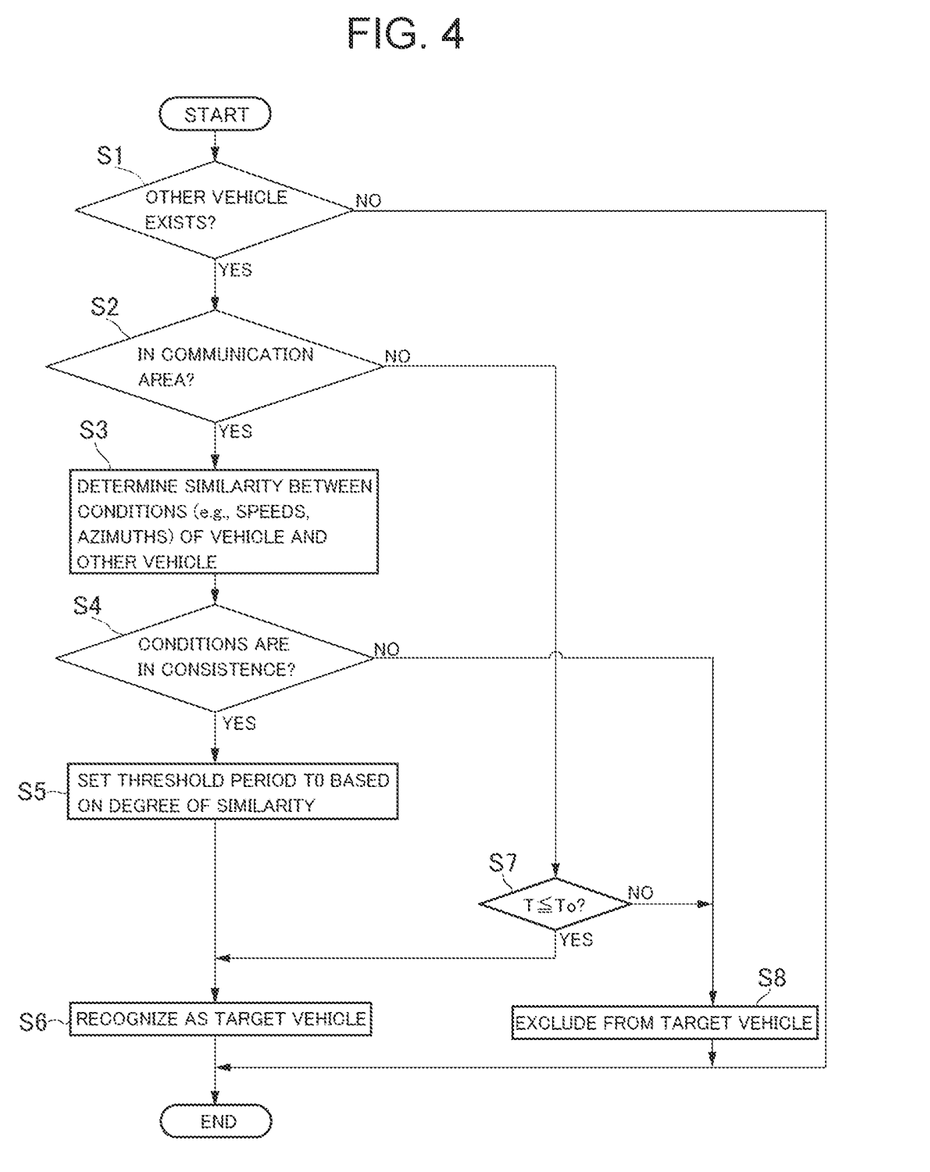
FIG. 4 is a flowchart showing one example of a routine executed by the controller.

To this end, the controller 6 executes a routine shown in FIG. 4 during propulsion of the vehicle. At step S1, it is determined whether other vehicle having a function to exchange information with the vehicle through the inter-vehicle communication and the road-to-vehicle communication exists around the vehicle. If other vehicle does not exist around the vehicle, in other words, if the information about other vehicle is not collected so that the answer of step S1 is NO, the routine returns. By contrast, if the information about other vehicle is collected so that the answer of step S1 is YES, the routine progresses to step S2 to determine whether said other vehicle from which the information was collected travels within the communication area.

Specifically, a position (i.e., coordinate data) of other vehicle may be specified based on the positional information of the vehicle contained in the information collected at step S1. At step S2, therefore, an existence of other vehicle within the communication area may be determined by comparing the coordinate data of said other vehicle with the coordinate data of the communication area set by the vehicle.

If other vehicle exists within the communication area so that the answer of step S2 is YES, the routine progresses to step S3 to determine a degree of similarity between the information about other vehicle and the information about the vehicle by the determiner 27. The information about vehicle and other vehicle includes speeds, traveling directions, azimuth angles, changes in the speeds, and changes in the speeds with respect to time of those vehicles. At step S3, therefore, each of the above-mentioned items of the information about other vehicle and the information about the vehicle are compared to each other to determine the degree of similarity. For example, as to the speeds of other vehicle and the vehicle, the degree of similarity between the speed of other vehicle and the speed the vehicle determined by the determiner 27 increases with a reduction in a difference between the speeds of other vehicle and the vehicle. Likewise, as to the azimuth angles of other vehicle and the vehicle, the degree of similarity between the azimuth angle of other vehicle and the azimuth angle of the vehicle determined by the determiner 27 increases with a reduction in a difference between the azimuth angles of other vehicle and the vehicle. The above-mentioned differences are individually compared to the threshold limit value as an upper limit value or a lower limit value of the degree of similarity. That is, if the difference is large enough to exceed the threshold limit value, or if the difference is small enough to fall below the threshold limit value, other vehicle is no longer recognized as the target vehicle to assist the driver of the vehicle.

Then, it is determined at step S4 whether a running condition of other vehicle is in consistence with a running condition of the vehicle based on the degree of similarity between the information about other vehicle and the information about the vehicle determined at step S3. Specifically, if the degree of similarity between the information about other vehicle and the information about the vehicle is large, the running condition of other vehicle is determined to be in consistence with the running condition of the vehicle. For example, if the difference between the speeds of other vehicle and the vehicle or/and the difference between the azimuth angles of other vehicle and the vehicle is/are small, the running condition of other vehicle is determined to be in consistence with the running condition of the vehicle.

If the answer of step S4 is YES, the routine progresses to step S5 to calculate the threshold period of time T0 by the time adjuster 29. As described, the threshold period of time T0 is a reference period of time of the elapsed time that other vehicle which has been recognized as the target vehicle travels out of the communication area. Specifically, the threshold period of time TO is set in accordance with the degree of similarity determined at step S3.

Then, at step S6, other vehicle running within the communication area whose running condition is in consistence with the running condition of the vehicle is recognized as the target vehicle, and the driver D of the vehicle is notified of the existence of the target vehicle. Specifically, at least information that the target vehicle exists ahead of the vehicle is indicated in the indicator 7 such as a monitor and a head-up display, and/or provided phonically to the driver D by emitting a voice message from the speaker 8.

Whereas, if other vehicle exists around the vehicle but travels out of the communication area so that the answer of step S2 is NO, the routine progresses to step S7 to determine whether an elapsed time T that other vehicle travels out of the communication area is equal to or shorter than the threshold period of time T0. Other vehicle traveling out of the communication area whose information is collectable may be categorized into: other vehicle which has never entered the communication area and hence which has not yet been recognized as the target vehicle; and other vehicle which has been recognized as the target vehicle but currently deviates from the communication area for some reason. Since the former mentioned other vehicle has not yet entered the communication area, the elapsed time T of the former mentioned other vehicle has not yet been counted. Therefore, the answer of step S7 will be NO even if the former mentioned other vehicle exists around the vehicle. In this case, the routine progresses to step S8 to exclude the former mentioned other vehicle from the target vehicle. That is, the former mentioned other vehicle is not recognized as the target vehicle.

As to the latter mentioned other vehicle which has been recognized as the target vehicle at step S6 but currently travels out of the communication area, the elapsed time T of said other vehicle is compared to the threshold period of time T0 at step S7. As described, the threshold period of time TO has been set for other vehicle recognized as the target vehicle at step S6 based on the degree of similarity between the running condition of other vehicle and the running condition of the vehicle. In addition, the elapsed time T about other vehicle recognized as the target vehicle at step S6 has been measured by the timer 28 from a point at which said other vehicle has moved out of the communication area. At step S7, therefore, the elapsed time T about other vehicle recognized as the target vehicle at step S6 is compared to the threshold period of time T0.

If the elapsed time T is equal to or shorter than the threshold period of time T0 so that the answer of step S7 is YES, the routine progresses to step S6 to maintain the recognition of the target vehicle. Thus, the recognition of the target vehicle currently traveling out of the communication area is maintained if the elapsed time T thereof is still within the threshold period of time T0. In this case, therefore, the driver assist control to notify the driver of the existence of the target vehicle is continued without interruption. In addition, if the degree of similarity between the running conditions of the target vehicle and the vehicle is large, the threshold period of time T0 is extended. In this case, therefore, the driver assist control to notify the driver of the existence of the target vehicle is continued even if the elapsed time T of the target vehicle is long.

That is, in the case that the degree of similarity between the running conditions of the target vehicle and the vehicle is large and hence the threshold period of time T0 of the target vehicle is long, it can be assumed that the relative position of the vehicle with respect to the target vehicle traveling out of the communication area is being maintained. In this case, it can be assumed that the target vehicle deviates from the communication area for a temporary reason, and hence the target vehicle is expected to enter the communication area again soon. In this case, therefore, the recognition of the target vehicle is maintained continuously. By contrast, in the case that the degree of similarity between the running conditions of the target vehicle and the vehicle is small, the threshold period of time T0 of the target vehicle is shortened. In this case, the running condition of the target vehicle is significantly different from the running condition of the vehicle, and hence the target vehicle deviated from the communication area. In this case, therefore, the target vehicle is not expected to come back to the communication area. If the recognition of the target vehicle is maintained in this case, the driver assist control will be continued unnecessarily to erroneously notify the driver of the existence of the target vehicle.

Then, if the target vehicle running out of the communication area within the threshold period of time T0 and still being recognized as the target vehicle at step S6 comes back to the communication area, the controller 6 determines that the target vehicle exists within the communication area at step S2. Consequently, the recognition of the target vehicle is maintained. By contrast, if the elapsed time T is longer than the threshold period of time T0 so that the answer of step S7 is NO, the routine progresses to step S8 to exclude other vehicle running out of the communication area from the target vehicle. In this case, even if other vehicle has been recognized as the target vehicle, the recognition of the target vehicle is cancelled.

That is, if the target vehicle travels out of the communication area more than the threshold period of time T0, the recognition of the target vehicle is cancelled even if the degree of similarity between the information about the target vehicle and the information about the vehicle is large. In the case that the degree of similarity between the information about the target vehicle and the information about the vehicle is large, the target vehicle is expected to come back to the communication area within the threshold period of time T0 if the relation between the target vehicle and the vehicle is not changed significantly. However, if the target vehicle does not come back to the communication area within the threshold period of time T0, the running condition of the target vehicle is assumed to be changed significantly from the running condition of the vehicle. In this case, therefore, the recognition of the target vehicle is cancelled to terminate the driver assist control, but the driver assist control will not be started again immediately. That is, the driver assist control will not be interrupted and repeated undesirably.

Likewise, if the degree of similarity of the information about the target vehicle with information about the vehicle is small, the recognition of the target vehicle is cancelled in short time after the target vehicle moved out of the communication area to terminate the driver assist control. In this case, since the degree of similarity between the information about the target vehicle and the information about the vehicle is small, the target vehicle is unlikely to come back to the communication area if the target vehicle moved out of the communication area. In this case, therefore, even if the recognition of the target vehicle is cancelled in short time after deviating from the communication area, such vehicle is unlikely to be recognized as the target vehicle again. That is, the driver assist control will not be interrupted and repeated undesirably.

Thus, other vehicle running within the communication area is recognized as the target vehicle or excluded from the target vehicle in accordance with the degree of similarity between the running conditions of the target vehicle and the vehicle, and other vehicle running out of the communication area is recognized as the target vehicle or excluded from the target vehicle based on the elapsed time T. Such selections of the target vehicle are made by the control selector 30 at steps S4 and S7, and thereafter, the driver assist control is selectively executed and terminated. That is, the control selector 30 selects a control from different controls depending on the degree of similarity determined by the determiner 27. Specifically, the target vehicle is recognized at step S6 and excluded at step S8 by the recognizer 25, and more specifically, the exclusion of the target vehicle at step S8 is executed by the excluder 26.

That is, if the running condition of other vehicle or the target vehicle is not in consistence with the running condition of the vehicle so that the answer of step S4 is NO, the routine progresses to step S8 to exclude such vehicle from the target vehicle. In other words, the degree of similarity between the running conditions of other vehicle or the target vehicle and the vehicle is small, other vehicle or the target vehicle is not recognized as the target vehicle. For example, if an orientation or an azimuth of an oncoming vehicle is 180 degrees different from an orientation or an azimuth of the vehicle, the oncoming vehicle is not recognized as the target vehicle. Such oncoming vehicle may temporarily enter the communication area in front of the vehicle, but will not form a platoon with the vehicle in the traveling direction of the vehicle. Therefore, the oncoming vehicle is excluded from the target vehicle. Thus, the driver will not be notified of an existence of the oncoming vehicle erroneously.

Next, here will be explained an example of recognizing the target vehicle with reference to FIGS. 5A, 5B, and 5C. In the situation shown in FIG. 5A, other vehicle V1 travels in front of the vehicle V0 to which the driver assist system 1 is applied through a straight road Rs, and other vehicle V1 has the function to exchange information with the vehicle. In this situation, other vehicle V1 travels within the communication area At set by the vehicle V0. Therefore, if a running condition e.g., a speed of other vehicle V1 is not significantly different from a speed of the vehicle V0, other vehicle V1 is recognized as the target vehicle V1. In addition, the threshold period of time T0 is set in accordance with the degree of similarity between the information about target vehicle V1 and the information about the vehicle V1.

Figure 5A:
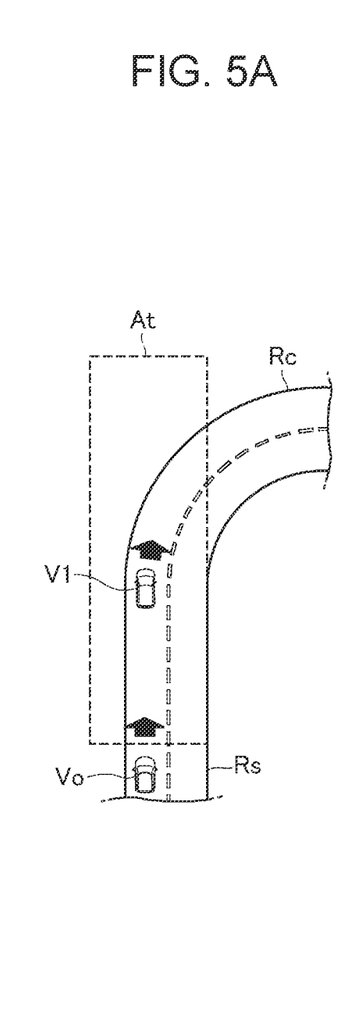
FIG. 5A is a schematic illustration showing an example of a situation in which a target vehicle travels in front of a vehicle to which the driver assist system is applied through a straight road.
Figure 5B:
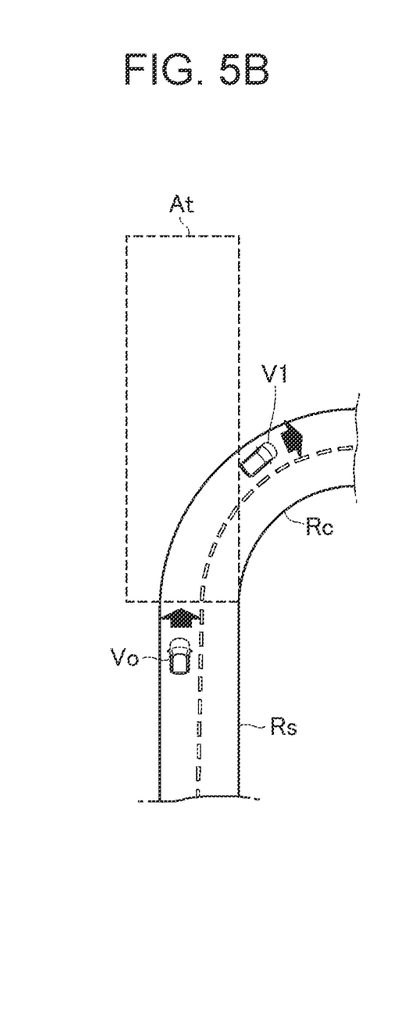
FIG. 5B is a schematic illustrating showing an example of a situation in which the target vehicle enters a curve and deviates temporarily from a communication area.

Then, when the target vehicle V1 enters a curve Rc as illustrated in FIG. 5B, the target vehicle V1 deviates from the communication area At. Specifically, the communication area At is set into a rectangular area extending from the straight road Rs in front of the vehicle V0 based on an azimuth and/or a yaw rate of the vehicle V0. Therefore, the target vehicle V1 deviates from the communication area At when entering the curve Rc. In this situation, although the target vehicle V1 is not located in front of the vehicle V0, the target vehicle V1 is still recognized as the target vehicle within the threshold period of time To to assist the driver. Therefore, the driver is continuously notified of the existence of the target vehicle V1.

Figure 5C:
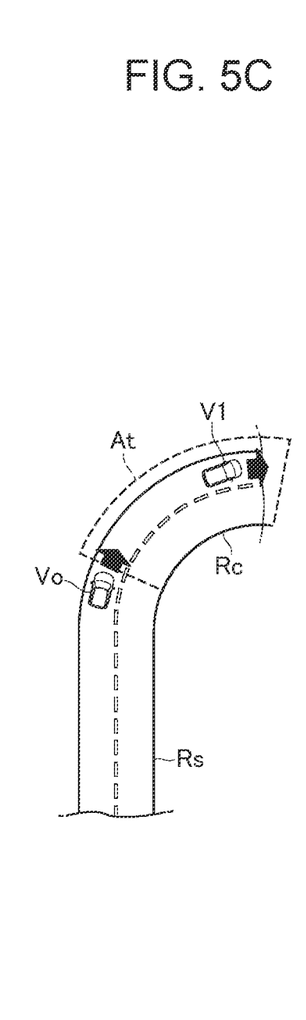
FIG. 5C is a schematic illustrating showing an example of a situation in which the target vehicle travels along the curve and the communication area is reshaped into a curved shape along the curve so that the target vehicle is in the communication area.

Thereafter, when the target vehicle V1 travels along the curve Rc as illustrated in FIG. 5C, the communication area At is reshaped into a curved shape along the curve Rc in accordance with e.g., a steering angle and/or yaw rate of the vehicle V0 so that the target vehicle V1 is covered with the communication area At again.

Thus, according to the example shown in FIGS. 5A, 5B, and 5C, the recognition of the target vehicle V1 is maintained within the threshold period of time T0 even if the target vehicle V1 temporarily deviates from the communication area At. Therefore, the driver assist control is continued without interruption before and after the deviation of the target vehicle V1 from the communication area At.

Figure 6:
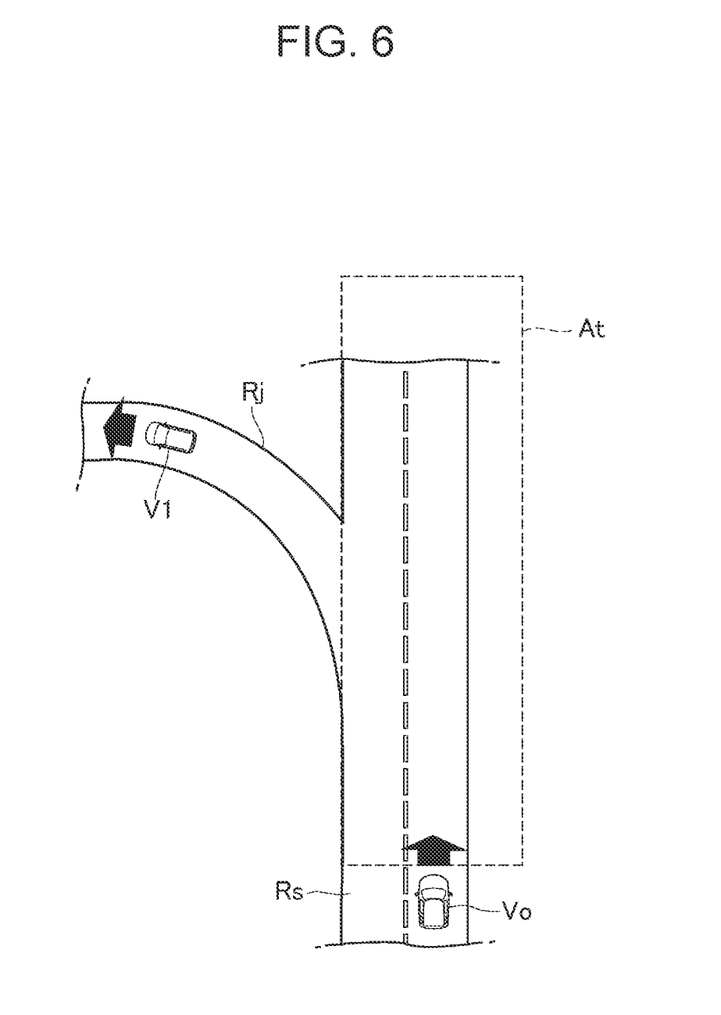
FIG. 6 is a schematic illustration showing an example of a situation in which the target vehicle enters a junction to deviate from the communication area.

Turning to FIG. 6, there is shown a situation in which the target vehicle V1 running in front of the vehicle V0 enters a junction Rj to deviates from the communication area At. In this situation, the target vehicle V1 is still recognized as the target vehicle within the threshold period of time To. However, the degree of similarity between the running conditions of the target vehicle V1 and the vehicle V0 is small. Therefore, the recognition of the target vehicle V1 is cancelled in a relatively short period of time after the target vehicle V1 deviated from the communication area At. Specifically, in the situation where the target vehicle V1 enters the junction Rj from the straight road Rs, a speed of the target vehicle V1 is reduced and a steering angle of the target vehicle V1 is changed significantly to change a traveling direction (or an azimuth angle) within the communication area At immediately before deviating from the communication area At. That is, the degree of similarity between the running conditions of the target vehicle V1 and the vehicle V0 is small. In this situation, therefore, the threshold period of time To is shortened with an increase in a difference between an azimuth of the target vehicle V1 and an azimuth of the vehicle V0.

The threshold period of time T0 may also be adjusted in accordance with a difference between speeds of the target vehicle V1 and the vehicle V0, instead of or in addition to the difference between the azimuth of the target vehicle V1 and the azimuth of the vehicle V0. Specifically, the threshold period of time T0 is shortened with an increase in a difference between speeds of the target vehicle V1 and the vehicle V0, or an accumulated value of a difference between speeds of the target vehicle V1 and the vehicle V0. In this case, since the positions of the target vehicle V1 and the vehicle V0 are different from each other in accordance with a distance therebetween, the speed of the vehicle V0 is changed at a predetermined site after the speed of the target vehicle V1 is changed at the predetermined site. Therefore, in order to compare the speeds of the target vehicle V1 and the vehicle V0 accurately, it is necessary to correct the speed of the target vehicle V1 based on such time gap derived from the positional difference.

Figure 7:
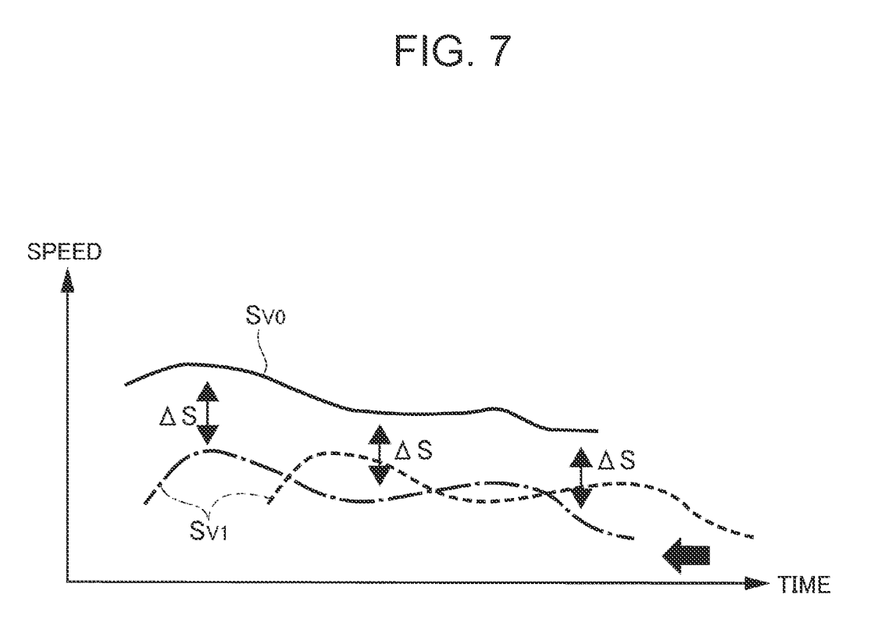
FIG. 7 is a graph showing a correction of a speed of the target vehicle to accurately calculate a difference between a speed of the vehicle and the speed of the target vehicle.

One example of such correction of the speed of the target vehicle V1 is shown in FIG. 7. In FIG. 7, the solid curve indicates a change in the speed SV0 of the vehicle V0, the dashed curve indicates an actual change in the speed SV1 of the target vehicle V1, the vertical axis represents the speed, and the horizontal axis represents the time. As indicated by the dashed curve, the speed SV1 of the target vehicle V1 is reduced to enter the junction Rj prior to a reduction in the speed SV0 of the vehicle V0. In this situation, if the speed SV1 of the target vehicle V1 and the speed SV0 of the vehicle V0 are compared to each other at a same time point, a difference therebetween may become inaccurate due to the positional difference between the target vehicle V1 and the vehicle V0. Therefore, in order to accurately calculate the difference ΔS between the speed SV1 of the target vehicle V1 and the speed SV0 of the vehicle V0 under the same conditions, the speed SV1 is corrected such that the speed SV1 detected at the predetermined site in advance corresponds to the speed SV0 changed thereafter at the same site as indicated by the dashed-dotted curve. Consequently, the difference ΔS between the speed SV1 of the target vehicle V1 and the speed SV0 of the vehicle V0 when passing through the predetermined site may be obtained.

Figure 8A:
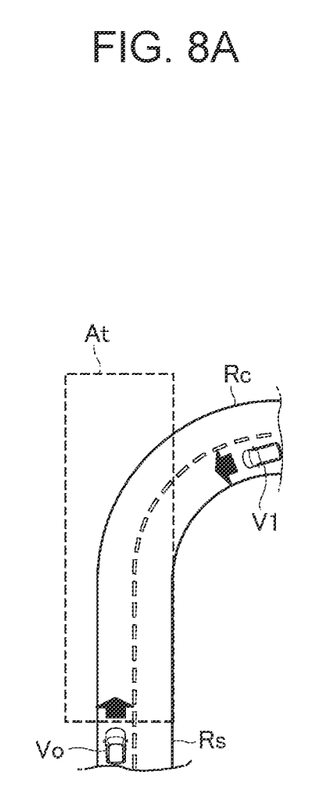
FIG. 8A is a schematic illustrating showing an example of a situation in which the vehicle travels on the straight road and an oncoming vehicle travels through a curve outside the communication rea.

Next, an example of excluding an oncoming vehicle from the target vehicle will be explained with reference to FIGS. 8A, 8B, and 8C. In the situation shown in FIG. 8A, the vehicle V0 travels on the straight road Rs, and the oncoming vehicle V1 travels through the curve Rc outside the communication area At. In this situation, therefore, the oncoming vehicle V1 is not recognized as the target vehicle, and the information about the oncoming vehicle V1 is not provided to the driver.

Figure 8B:
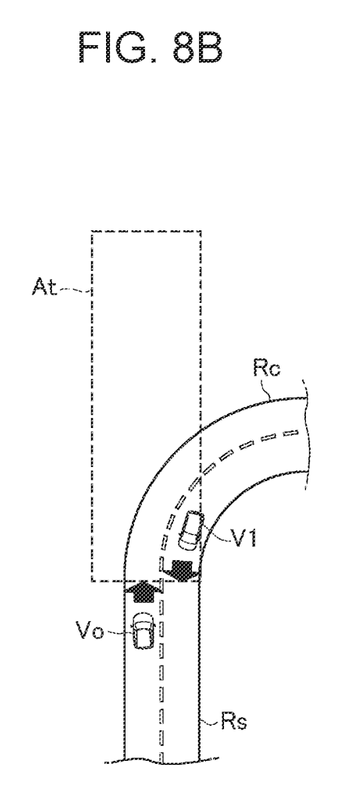
FIG. 8B is a schematic illustrating showing an example of a situation in which the oncoming vehicle enters the communication area.
Figure 8C:
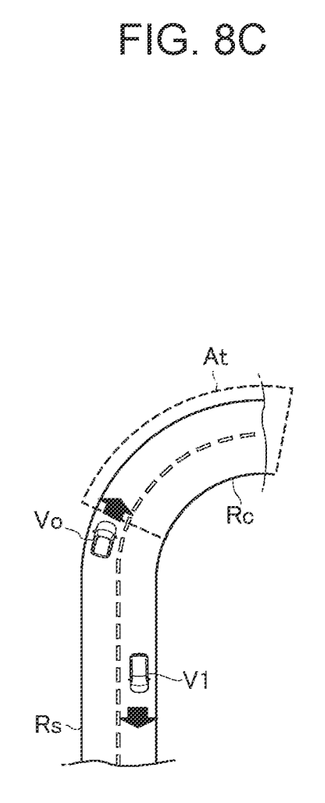
FIG. 8C is a schematic illustrating showing an example of a situation in which the oncoming vehicle and the vehicle pass each other.

Then, when the oncoming vehicle V1 and the vehicle V0 come close to each other as illustrated in FIG. 8B, the oncoming vehicle V1 enters the communication area At. In this situation, however, a traveling direction of the oncoming vehicle V1 is 180 degrees different from a traveling direction of the vehicle V0. That is, a running condition of the oncoming vehicle V1 is not in consistence with a running condition of the vehicle V0, and hence a degree of similarity between the information about the oncoming vehicle V1 and the information about the vehicle V0 is smaller than the lower limit value. In this situation, therefore, the oncoming vehicle V1 is not recognized as the target vehicle in spite of the fact that the oncoming vehicle V1 enters the communication area At.

After the oncoming vehicle V1 and vehicle V0 pass each other, the oncoming vehicle V1 will not enter the communication area At. That is, the oncoming vehicle V1 will not be recognized as the target vehicle. Therefore, the driver will not be notified of an existence of the oncoming vehicle V1 erroneously and unnecessarily.

Although the above exemplary embodiments of the present disclosure have been described, it will be understood by those skilled in the art that the present disclosure should not be limited to the described exemplary embodiments, and various changes and modifications can be made within the scope of the present disclosure. For example, the determination at step S2 may also be made after step S5. In addition, in the situation shown in FIGS. 5A, 5B, and 5C, the communication area may also be set as a fixed area instead of the flexible area. That is, in the situation shown in FIGS. 5A, 5B, and 5C, the curve Rc is not a round section and the target vehicle is expected to enter the communication area again if the degree of similarity between the information about the target vehicle V1 and the information about the vehicle V0 is large enough. Therefore, the driver assist control will be continued during the situation shown in FIGS. 5A, 5B, and 5C even if the communication area At is set as a fixed area. As an option, a width of the communication area may be widened to cover the target vehicle traveling through a curve.

What is claimed is:

1. A driver assist system that sets a communication area in front of a vehicle to which the driver assist system is applied, that recognizes an other vehicle existing within the communication area as a target vehicle, and that notifies a driver of the vehicle of at least an existence of the target vehicle, comprising:
a controller that controls assistance information to assist the driver to operate the vehicle,
wherein the controller comprises:
a timer that measures an elapsed time from a point at which the target vehicle moved out of the communication area; and
a recognizer that recognizes said other vehicle as the target vehicle until the elapsed time measured by the timer exceeds a threshold period of time, and that cancels a recognition of said other vehicle as the target vehicle when the elapsed time measured by the timer exceeds the threshold period of time.

2. The driver assist system as claimed in claim 1, further comprising:
a determiner that determines a degree of similarity between vehicular information about said other vehicle located within the communication area and vehicular information about the vehicle by comparing the information about said other vehicle with the information about the vehicle; and
a control selector that selects a control from different controls depending on the degree of similarity determined by the determiner.

3. The driver assist system as claimed in claim 2,
wherein the control selector comprises a time adjuster that adjust the threshold period of time based on the degree of similarity determined by the determiner, and
the time adjuster is configured to extend the threshold period of time when the degree of similarity is larger than a predetermined degree, and shorten the threshold period of time when the degree of similarity is smaller than the predetermined degree.

4. The driver assist system as claimed in claim 2,
wherein the vehicular information about the vehicle includes an azimuth angle and a speed of the vehicle, and the vehicular information about said other vehicle includes an azimuth angle and a speed of said other vehicle, and
the degree of similarity determined by the determiner increases with a reduction in a difference between the azimuth angles or the speeds of the vehicle and said other vehicle.

5. The driver assist system as claimed in claim 3,
wherein the vehicular information about the vehicle includes an azimuth angle and a speed of the vehicle, and the vehicular information about said other vehicle includes an azimuth angle and a speed of said other vehicle, and
the degree of similarity determined by the determiner increases with a reduction in a difference between the azimuth angles or the speeds of the vehicle and said other vehicle.

6. The driver assist system as claimed in claim 4, wherein the determiner is further configured to calculate the difference between the speeds of the vehicle and said other vehicle by comparing the speed of the vehicle when passing through a predetermined site to the speed of said other vehicle when passing through the predetermined site.

7. The driver assist system as claimed in claim 5, wherein the determiner is further configured to calculate the difference between the speeds of the vehicle and said other vehicle by comparing the speed of the vehicle when passing through a predetermined site to the speed of said other vehicle when passing through the predetermined site.

8. The driver assist system as claimed in claim 2, wherein the control selector includes an excluder that excludes other vehicle in the communication area whose degree of similarity determined by the determiner is equal to or smaller than a threshold limit value from the target vehicle.

* * * * *